Figure 1:
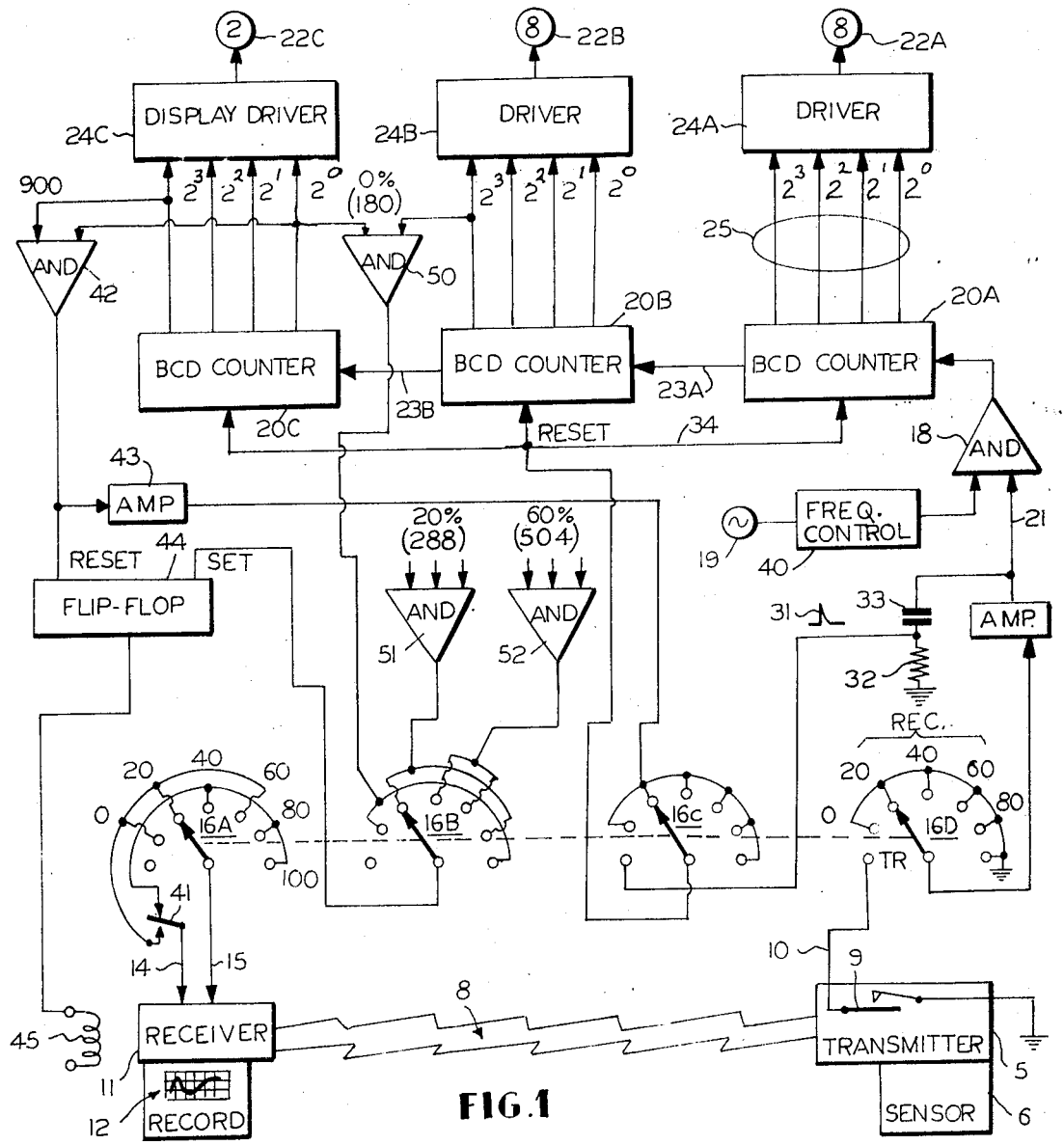

United States Patent [19]
Bryant et al.

[11] 3,742,472
[45] June 26, 1973

[54] ELECTRONIC TELEMETERING CALIBRATOR

[75] Inventors: John A. Bryant; Orion P. Horne; Edwin L. Mullikin, Jr., all of Owensboro, Ky.

[73] Assignee: Texas Gas Transmission Corporation, Owensboro, Ky.

[22] Filed: Dec. 27, 1971

[21] Appl. No.: 211,980

[52] U.S. Cl............................ 340/177 CA, 340/206
[51] Int. Cl........................ G08c 19/22, G08c 15/12
[58] Field of Search..................... 340/177 CA, 206

[56] References Cited
UNITED STATES PATENTS
3,345,625  10/1967  Russell.................. 340/177 CA Primary Examiner—Thomas B. Habecker
Attorney—Laurence R. Brown

[57] ABSTRACT

A special-purpose electronic time interval instrument is described which is used to calibrate both transmitting and receiving mechanical equipment operating at opposite ends of a telemetering link providing pulse-width modulated signals. The instrument provides a countdown of pulses from an oscillator source to establish specified time intervals for both receiver and transmitter calibration. To calibrate the telemeter transmitter, the transmitted pulse resets and gates the counter to give a counter readout indicative of the elapsed time. Control circuits provide for converting standard pulse shapes produced on telemeter links directly into counts representative of the percentage of full-scale readout transmitted. In order to calibrate the receiver, the control circuits preset the count to generate pulse intervals for various percentages of full-scale signals.

5 Claims, 2 Drawing Figures

Patented June 26, 1973 3,742,472

INVENTORS
John A. Bryant
Orion P. Horne
Edwin L. Mullikin, Jr.
BY Laurence R. Brown
ATTORNEY

ELECTRONIC TELEMETERING CALIBRATOR

This invention relates to telemetering systems and, more particularly, it relates to the calibration of mechanical pulse interval transmitting and receiving equipment in telemetering systems.

It is conventional for telemetering links to transmit variable data such as pressure or some other physical property by an electronic pulse of a duration indicating, for example, the magnitude of the pressure. Commonly employed systems use 5 to 15 second intervals for each periodically repeated pulse in the transmission. In general, at the transmitting station is a movable transducer indicator coupled to a mechanical scanner which runs at periodically recurring intervals to turn on and off a switch to define a time interval within each repetitive period of fifteen seconds, for example, thereby identifying with the pulsed duration the magnitude of the transmitted property so that the system can follow changes which may occur from pulse to pulse. Receiving equipment at the other end of a wire or wireless telemetering link then provides a visual indication, generally on a record chart, which is generated by a further mechanical follower responsive to the pulse duration in each transmitted period. The mechanical converters are generally delicate and sensitive and are provided with various alignment and calibration adjustments.

When precision measurements are necessary, the mechanical converters at both the transmitter and receiver must be calibrated frequently to compensate for wear and tear or misadjustment caused by the continuous operation over many pulse cycles. Furthermore, each transmitter and receiver mechanism must be matched and tracked for similar response across the reading range. It has been costly and difficult to ascertain that the alignment is proper at both ends of the telemetering link because of the difference in physical location of the transmitter and receiver mechanisms.

In addition prior art systems have utilized mechanical calibrators operating in principle substantially identically to the similar telemetering equipment used in the system thus introducing similar problems of wear and mechanical adjustment in the calibration equipment itself, without reference to an independent calibration standard that could be held to close tolerances. The dependence upon motion of a delicate mechanical movement thereby prevents reliable calibration over long periods of time and thus introduces significant maintenance and operational expense.

Accordingly, it is an object of the present invention to provide improved calibration instrumentation for aligning both the transmitter and receiver equipment from a single location.

Another object of the invention is to provide a single, simple, inexpensive and efficient electronic calibration instrument for use in a telemetering system to align both the receiver and transmitter mechanisms.

A still further object of the invention is to provide electronic telemetering calibration instruments with a different principle of operation to that used in the telemetering system thereby affording an independent calibration standard based upon a standardized time period.

Figure 2:
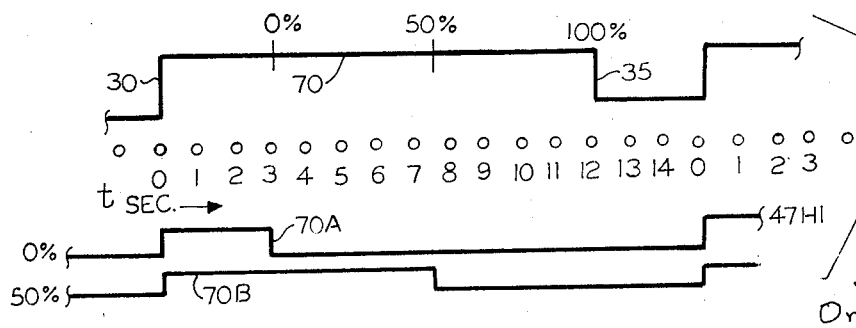

Other features, advantages and objectives of the invention will be found in the following detailed description of the invention accompanied by the drawings, wherein:

FIG. 1 is a schematic circuit diagram, partly in block, of a calibration instrument afforded by the invention, and FIG. 2 is a waveform diagram illustrating the nature of the periodic pulse width modulated signals conveyed over the telemetering link, and generated in the calibration instrument.

For purposes of simplifying details and, thus, making more clear the nature of the invention, the block and circuit diagrams in the drawings are of the single lead convention, since those skilled in the art are able to supply proper intercircuit matching connections, power, ground and return leads, and typical details of the various blocks are well known in the art.

The telemetering system in which the calibration instrumentation of FIG. 1 is used has a transmitter 5 operating to convert a parameter such as pressure identified by sensor 6 by well-known mechanical converters into a variable duration electrical pulse signal represented by waveform 7 (FIG. 2), whose duration is representative of the magnitude of the sensed parameter to be transmitted over communication link 8. Thus, for a 15 second telemetering pulse cycle, switch 9 may be closed periodically by a mechanism (not shown) to generate a pulse starting at time = 0 (FIG. 2), including a guard band of 3 seconds and a signal pulse of 9 seconds; thus, terminating at time = 12, leaving a 3 second guard period after a signal pulse of 100 per cent magnitude before the next cyclic zero time designation. The shown pulse waveform 7 of 12 seconds duration represents a full-scale (100 percent) signal parameter, such as might be provided from a transmitting mechanism at switch 9 and available on auxiliary lead 10 for testing the calibration of the transmitter mechanism.

In the receiver 11, a corresponding mechanism converts the signal pulse waveform (7) into an indication such as that on record strip 12 of the magnitude of the signal transmitted and received over the communication link 8. Auxiliary leads 14, 15 are provided for supplying test calibration signals to the receiver 11. The calibration scale of the indicator at the receiver may be designated in terms of pressure, or in some arbitrary manner. Typically, the scale may show a reading of 0 to 100 identifying the percentage of full parameter magnitude as transmitted during the active signal pulse period. Thus, a 7½ second pulse transmission would show a 50 percent reading on the receiver scale, etc.

In the transmitter 5 and the receiver 11 are calibration adjustment means (not shown) which can be used to adjust and align the respective transmitted signals and displayed response indication. Because these devices depend upon delicate, periodically operating mechanisms which may be continuously operated, they must be calibrated frequently to assure transmission and reproduction of identical accurate signal pulse lengths tracking over the entire signal magnitude variations. The electronic instrumentation circuitry of FIG. 1 does this simply and effectively.

TRANSMIT MODE

For calibrating the transmitter, a first mode of operation is established when switch 16, with its several ganged banks A, B, C, D, is in its counter-clockwise most position marked TR on switch bank 16D. Then transmitter switch 9 provides a path through the switch arm of bank 16D and through buffer-amplifier 17 to AND gate 18, which gates pulses from the oscillator or other source of periodic timing pulses 19 into counter stage 20A when lead 21 is grounded. A numerical indicator 22 shows the count on each counter stage. The three counter stages shown operate in the binary-coded-decimal mode with outputs 23 driving each succeeding stage. Display drivers 24 operate the count indicators 22 for each count stage 20 from the binary signals available at leads 25.

Typically, if the timing pulse source 19 is the 60Hz A.C. line frequency, a count of 720 would occur during the full 12 second maximum scale period for each pulse transmission, such as represented by signal pulse 7. At each leading edge 30 of waveform 7, the counter is reset to zero by means of the differentiated leading edge waveform pip 31 obtained through R-C circuit 32, 33 and connected through the movable arm of switch bank 16C to reset bus 34. Thus, a count of timing pulses from source 19 will be displayed on indicators 22 starting from the leading edge 30 of waveform 7 and terminating at the trailing edge 35 during which period gate 18 will be opened. If a signal reading a parameter such as pressure is provided with a scale of 180 to 720 psi, this readout on indicators 22 will be directly in psi.

RECEIVER MODE

When calibrating the receiver, the instrument serves to generate a plurality of typical pulse waveforms, such as 70 having different durations in the signal range, in the case illustrated in FIG. 2, from 3 to 12 seconds. Thus, the gang switch 16 has "Receiver" positions operable to generate pulses of 0, 20, 40, 60, 80 and 100 percent of the maximum signal scale as marked in switch section 16D.

In this receiver mode of operation, the timing pulse gate 18 is opened continuously to permit counting from the timing pulse source 19 through 15 second periods after which the counter is reset ($t=0$) for a further count cycle by gate 42 at the count OF 900 (with 60 Hz pulses). Thus, the "nine" count on counter stage 20C operates gate 42 and buffer-amplifier 43 in the "Receiver" positions of switch bank 16C to produce a reset pulse at reset bus 34, and a series of 15 second cycles is generated simulating the standard telemeter link transmission period.

The reset operation pulse at the 900 count also serves to reset flip-flop 44 to energize relay 45. This serves by relay contact arm 41 to provide one of the high or low levels 46, 47 of the signal (70) to the receiver test leads 14, 15 in a polarity dependent upon the position of the switch arm in gang switch bank 16A. Thus, switch banks 16A and 16B serve, in principle, as reversing switches in order to produce the six different check points from only three input signals at predetermined counts of the counter, provided in AND gates 50, 51 52 respectively. Gate 50 operates at a count of 180 to provide an output pulse. Gates 51 and 52 are connected to appropriate counter leads to produce respective outputs at counts 288 and 504.

Thus, if the Receiver 0 percent calibration point is selected in a 60 Hz count mode by switch banks 16A and 16D in the counter-clockwise most Receiver position, at the counter reset position afforded each 15 seconds ($t=0$) at the count of 900 at AND gate 42, relay 45 will be energized to lower contact arm 41 and close receiver lead 15, thereby establishing the high level 47 leading edge of the test signal pulse waveform 70 (FIG. 2). At the count of 180, 3 seconds later as signalled by AND gate 50 flip-flop 44 will be set through switch arm 16B and open relay 45 contact arm to the position shown at lead 14, thereby opening leads 14 and 15 to establish the low level 46 trailing edge of the waveform 70. As shown in waveform 70A representing 0 percent scale reading, the receiver uses the first 3 seconds as a guard band.

In the typical telemetering receiver mechanism, reciprocal acting mechanical devices use both the positive going and negative going signal pulses to set and check each reading point. Thus, for the 0 percent calibration point just described, the operation of the mechanism tends to scan and move a pointer up to zero scale during the first 3 seconds of waveform 70A and to scan and move the pointer down to zero scale during the remaining 12 seconds of the period, so that if the pointer rests on zero scale, neither scan will affect the reading, but the pointer will be moved either up or down respectively, as necessary, if off a zero reading.

In utilizing this operation of the receiver, the polarity reversing switch banks 16A and 16B thus may serve to use gate 50 also for a 100 percent reading by moving the switch bank to the clockwise most position.

Similarly AND gate 51, at a count of 288, will provide a 20 percent pulse readout in one polarity and an 80 percent readout in the opposite polarity. Likewise, AND gate 52, at a count of 504, will produce 60 and 40 percent pulse waveform durations by operation of reversing switch banks 16A and 16B.

Should it be desired to provide a direct readout on the counters for the range 0–100 percent of full scale, then the frequency of pulse source 19, which may be an accurately controlled high-frequency crystal oscillator, for example, is divided down in the frequency control section 50 to a desired count rate. For a 15 second telemetering pulse period, as shown in FIG. 2, with 3 second guard bands on each end of the pulse, the frequency of the divided down oscillations should be 111.11 Hz for a three-digit display counting to 100 percent full scale in nine seconds for direct scale readout conformation, and the counter would be reset so that the zero count will occur at the expiration of the 3 second guard interval, and full scale will be 999, with a reset pulse at the 1,000 count.

It is seen, therefore, that an electronic instrument is provided which operates to calibrate both the transmitter and receiver mechanism in the telemetering link, and this may be done with an instrument located at either the receiver or transmitter location since the electronic accuracy of the instruments is good, particularly when employing high-frequency crystal oscillator timing pulse sources.

The transmitter, thus, may be checked by a series of counter readouts representative of various signal pulse durations, such as 0, 20, 40, 60, 80 and 100 percent full scale, and matched or tracked, with receiver operation similarly checked with pulse durations derived from the same timing pulse source. The receiver signal pulses could be transmitted over the link to a remote location, if desired.

What is claimed is:

1. In an electronic instrument adapted to calibrate both (*a*) a transmitter mechanism producing from a variable parameter a periodic electric pulse signal with a variable duration representing the magnitude of said parameter, and (b) a receiver mechanism producing from said variable duration electric pulse signal when transmitted over a communication link an indication of the magnitude of said parameter on a predetermined calibrated scale, the combination comprising a source of periodic timing pulses at a frequency substantially greater than the periodic rate of said pulse signals, a resettable counter adapted to count said timing pulses, an indicator displaying the count in said counter, and control circuit means connected for operating said counter for transmitter and receiver calibration in the two respective operating modes of selectively (1) gating said timing pulses into the counter in response to each said periodic pulse signal produced by said transmitting mechanism and deriving from the count of the timing pulses in said counter on said indicator a display in terms matching said calibrated scale representative of the duration of the variable duration of the electric pulse signal produced by the transmitter mechanism, and (2) establishing for a plurality of predetermined check points on said calibrated scale respective cycles of a predetermined number of counts in said counter from said timing pulses and converting said cycles to a pulse signal output of duration corresponding to the predetermined number of counts therein for operation of said receiver mechanism.

2. An instrument as defined in claim 1 wherein said calibrated scale provides a percentage of a maximum calibrated pulse duration reading and said frequency of the timing pulses is adjusted to produce a display on said indicator of said timing pulse count corresponding directly to said percentage of maximum pulse duration.

3. An instrument as defined in claim 1 wherein the control circuit means includes guard band means operable from a predetermined count on said counter for producing a guard band interval of predetermined time between said periodic signal pulses produced for operating said receiver mechanism.

4. An instrument as defined in claim 1 wherein the plurality of predetermined check points is established by a set of fewer predetermined count output connections on said counter and polarity control means for changing the polarity of said pulse signal output adapted to operate the receiver mechanism with selected ones of said fewer predetermined counts to establish a greater number of predetermined check points.

5. An instrument as defined in claim 4 wherein the polarity control means comprises a multiple-position switching bank ganged with other switch banks selectively establishing said plurality of check points.

* * * * *